United States Patent
Underwood

(10) Patent No.: US 10,750,027 B1
(45) Date of Patent: Aug. 18, 2020

(54) CALL CONTROL IN TELEPHONY-CAPABLE COMMUNICATIONS NETWORKS

(71) Applicant: Metaswitch Networks Ltd, Enfield (GB)

(72) Inventor: Richard Underwood, Enfield (GB)

(73) Assignee: Metaswitch Networks Ltd, Enfield (GB)

(*) Notice: Subject to any disclaimer, the term of this patent is extended or adjusted under 35 U.S.C. 154(b) by 0 days.

(21) Appl. No.: 16/685,812

(22) Filed: Nov. 15, 2019

(30) Foreign Application Priority Data

Apr. 18, 2019 (GB) .................................. 1905589.6

(51) Int. Cl.
| | |
|---|---|
| *H04L 12/66* | (2006.01) |
| *H04M 3/56* | (2006.01) |
| *H04W 4/20* | (2018.01) |
| *H04L 12/50* | (2006.01) |
| *H04M 7/00* | (2006.01) |

(52) U.S. Cl.
CPC .............. *H04M 3/56* (2013.01); *H04W 4/20* (2013.01); *H04L 12/50* (2013.01); *H04M 7/006* (2013.01); *H04M 2203/5018* (2013.01); *H04M 2207/187* (2013.01)

(58) Field of Classification Search
None
See application file for complete search history.

(56) References Cited

U.S. PATENT DOCUMENTS

| | | | |
|---|---|---|---|
| 6,545,697 B1 | 4/2003 | Parker et al. | |
| 7,792,019 B1* | 9/2010 | Ger .......................... | H04M 3/58 370/228 |
| 2002/0093942 A1* | 7/2002 | Yegoshin ................ | H04L 29/06 370/352 |
| 2005/0003821 A1* | 1/2005 | Sylvain ............. | H04W 36/0027 455/444 |
| 2005/0003857 A1* | 1/2005 | Sylvain ................... | H04M 3/54 455/554.1 |

(Continued)

FOREIGN PATENT DOCUMENTS

| | | |
|---|---|---|
| EP | 1156654 A2 | 11/2001 |
| GB | 2488517 A | 9/2012 |
| GB | 2553725 A | 3/2018 |

OTHER PUBLICATIONS

Combined Search and Examination Report dated Aug. 23, 2019 for UK Application No. GB1905589.6.

(Continued)

*Primary Examiner* — Bob A Phunkulh
(74) *Attorney, Agent, or Firm* — EIP US LLP

(57) ABSTRACT

A method of operating a call control node in a telecommunications network, the method comprising the steps of: establishing a telephony call between a first user and a second user; receiving a call control instruction, the call control instruction being for associating a to-be-established new call leg, between the call control node and a communications server, with the telephony call; establishing the new call leg between the call control node and the communications server; connecting the new call leg to the telephony call on the basis of the call control instruction, to make the communications server a party to the telephony call.

8 Claims, 9 Drawing Sheets

(56) References Cited

U.S. PATENT DOCUMENTS

| | | | |
|---|---|---|---|
| 2008/0037430 A1* | 2/2008 | Wah | H04M 7/123 370/241 |
| 2008/0037533 A1* | 2/2008 | Wah | H04L 65/1046 370/389 |
| 2009/0092093 A1* | 4/2009 | Wu | H04W 36/0033 370/331 |
| 2010/0104074 A1 | 4/2010 | Yang | |
| 2010/0165982 A1* | 7/2010 | Yegoshin | H04L 29/06 370/352 |
| 2010/0310059 A1 | 12/2010 | Davis et al. | |
| 2011/0244835 A1* | 10/2011 | George | H04M 3/42323 455/414.1 |
| 2011/0255410 A1* | 10/2011 | Yamen | H04L 12/5691 370/237 |
| 2012/0057683 A1* | 3/2012 | Liik | H04L 65/1069 379/32.01 |
| 2013/0163433 A1* | 6/2013 | Baldwin | H04L 65/1006 370/236 |
| 2014/0105378 A1* | 4/2014 | Finlayson | H04M 3/2281 379/211.03 |
| 2014/0372555 A1 | 12/2014 | Brunsman et al. | |
| 2015/0078332 A1* | 3/2015 | Sidhu | H04W 36/0066 370/331 |
| 2015/0188727 A1* | 7/2015 | Bruner | H04L 65/403 370/329 |
| 2016/0014591 A1* | 1/2016 | Sekaran | H04W 12/00 455/432.1 |
| 2016/0112941 A1* | 4/2016 | Desai | H04M 15/70 370/329 |

OTHER PUBLICATIONS

Combined Search and Examination Report dated Oct. 14, 2019 for UK Application No. GB1905590.4.
Response to Combined Search and Examination Report dated Sep. 11, 2019 for UK Application No. GB1905589.6.
Examination Report dated Oct. 10, 2019 for UK Application No. GB1905589.6.
Response to Examination Report dated Oct. 16, 2019 for UK Application No. GB1905589.6.
No Further Objections dated Oct. 23, 2019 for UK Application No. GB1905589.6.
Combined Search and Examination Report dated Aug. 23, 2019 for GB Application No. GB1911237.4.

* cited by examiner

US 10,750,027 B1

CALL CONTROL IN TELEPHONY-CAPABLE COMMUNICATIONS NETWORKS

CROSS-REFERENCE TO RELATED APPLICATIONS

This application claims priority to UK Application No. GB1905589.6, filed Apr. 18, 2019, under 35 U.S.C. § 119(a). The above-referenced patent application is incorporated by reference in its entirety.

BACKGROUND OF THE INVENTION

Technical Field

The present disclosure relates to improved methods of call control in telephony-capable communications networks.

Background

Traditional telephony, based on circuit-switched networks such as PSTN (Public Switched Telephony Networks) and GSM (Global System for Mobile communications), is moving towards packet-based telephony using technologies such as Voice over LTE (VoLTE) and Next Generation Network (NGN), also referred to as Fifth Generation (5G) technologies. This move to packet-based technologies allows for the convergence of voice and data as well as the provision of further communications services such as instant messaging, audio and video conferencing, desktop sharing etc. One of the issues associated with these developments is that the user experience can be overly complex, especially when a user attempts to transition from one service to another.

For example, there are known ways to convert a two-way circuit-switched call into a three-way circuit-switched call. However, these techniques are not familiar nor easy to achieve and may requires that specific call control actions are taken in the correct order and the process is not simple or user friendly.

Alternatively, meeting services such as Skype™ may be used. However the quality of a telephony call may be lower than that available via a telephony-capable network such as known cellular networks.

SUMMARY

According to a first aspect of the present disclosure, there is provided a method of operating a call control node in a telecommunications network, the method comprising the steps of: establishing a telephony call between a first user and a second user; receiving a call control instruction, the call control instruction being for associating a to-be-established new call leg, between the call control node and a communications server, with the telephony call; establishing the new call leg between the call control node and the communications server; connecting the new call leg to the telephony call on the basis of the call control instruction, to make the communications server a party to the telephony call.

According to a second aspect of the present disclosure, there is provided a method of operating a communications server in a telecommunications network, the method comprising the steps of: setting up a communications session, the communications session using a first communications link for communicating session data between a first user terminal associated with a first user and the communications server, the first user being party to a telephony call with a second user in the telecommunications network, the telephony call being controlled by a call control node associated with the first user; establishing a new call leg with the call control node, in order to make the communications server a party to the telephony call via the new call leg, associating the new call leg with the communications session, in order to associate the communications session with the telephony call.

An advantage of the invention is that an in-progress telephony call may be uplifted at the communications server whilst maintaining the telephony call, thereby improving call continuity. The telephony call may be native to a telephony-optimized communications network, and therefore may be of a higher quality than available by communicating telephony data with a communications server directly. There is no need for a call party to take specific call control actions to merge in, or cut over to, the new call leg, other than to uplift the call to the communications server.

Further features and advantages of the disclosure will become apparent from the following description of preferred examples of the disclosure, given by way of example only, which is made with reference to the accompanying drawings.

DETAILED DESCRIPTION OF CERTAIN INVENTIVE EMBODIMENTS

Figure 1:
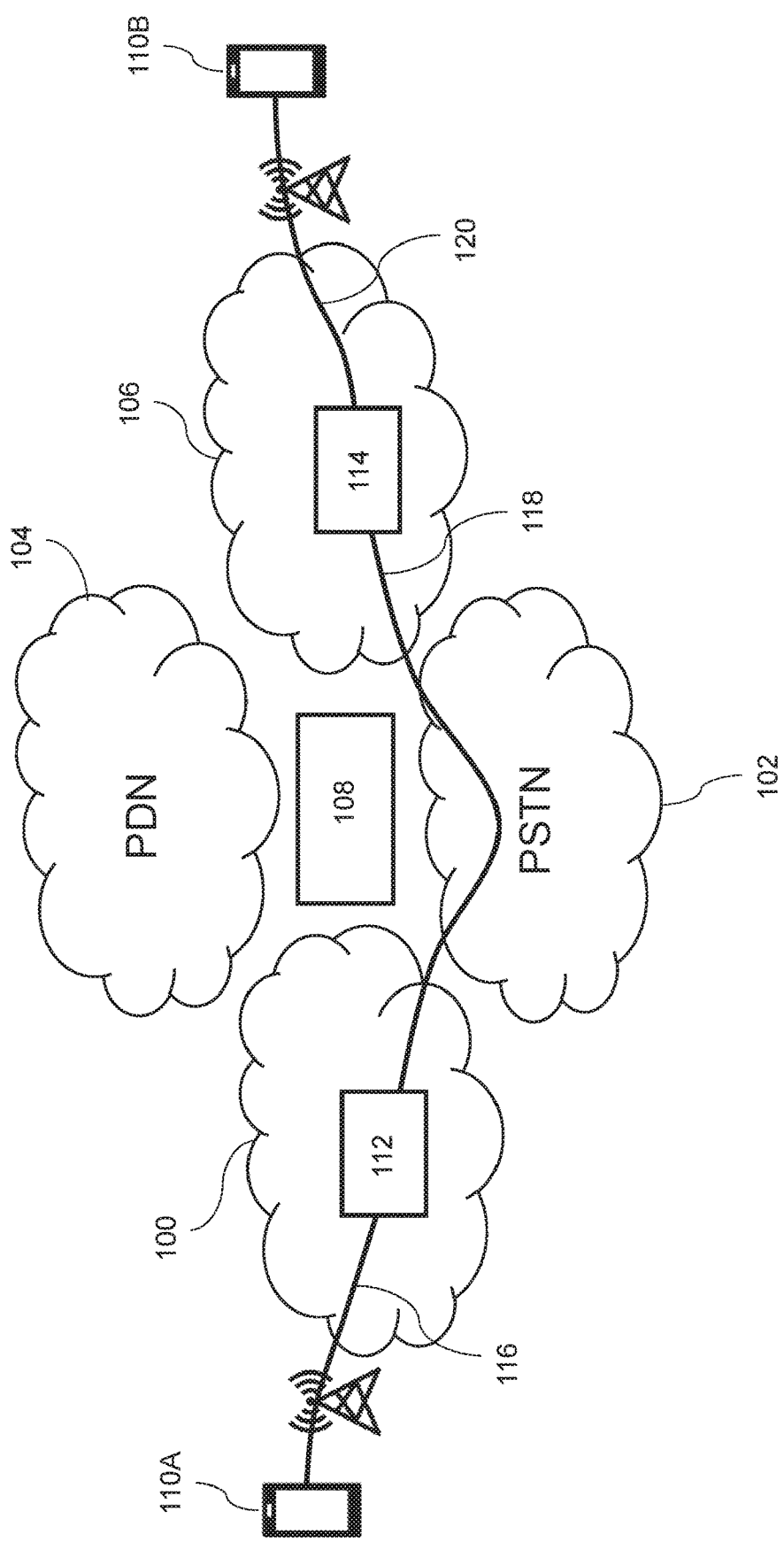
FIG. 1 shows a schematic depiction of a communications network according to a first example of the present disclosure when a voice call is in progress.

FIG. 1 shows a schematic depiction of a communications network according to a first example of the present disclosure when a voice call is in progress. The communications network may include a plurality of interconnected communications networks including a first cellular network 100, a public switched telephony network (PSTN) 102, a packet data network (PDN) 104 such as the Internet, and a second cellular network 106. A communications server 108, referred to herein as a "meeting server", may be connected each of to the cellular communications networks 100, 106 via both the PSTN 102 and the PDN 104. Whilst the communications server 108 is referred to herein as a "meeting server", it should be understood that the meeting server generally provides one or more communications service, which may or may not include one or more meeting service.

FIG. 1 also shows first user terminal 110A and second user terminal 110B.

These cellular user terminals are telephony devices, such as smartphones, which are adapted to conduct voice telephony. The user terminals 110A, 110B may be Long Term Evolution (LTE) user terminals and/a Next Generation Network (NGN) user terminals, also referred to as Fifth Generation (5G) user terminals.

The first cellular network 100 may be a Long Term Evolution (LTE) network or a Next Generation Network (NGN) network, also referred to as a Fifth Generation (5G) network. The cellular network 100 includes a plurality of radio base stations, of which only one is shown for the sake of clarity, forming part of a radio access network (RAN) associated with the cellular network 100.

The first cellular network 100 may include a plurality of call control nodes, in the form of telephony application servers (TASs), of which only one TAS 112 is shown for the sake of clarity, forming part of a core network of the cellular network 100. The TAS 112, sometimes known in a telephony context only as an application server (AS), is used in the core network to provide telephony applications and may provide additional multimedia functions. The core network may have an NGN or IP Multimedia Subsystem (IMS) architecture. The TAS 112 may include components providing call control and/or media transformation, such as a softswitch and/or media gateway.

The TAS 112 may include functionality adapted to emulate the calling features provided by the PSTN, referred to as PSTN Emulation Subsystem (PES), and can include calling features like call forwarding, voicemail and conference bridges. The TAS 112 may additionally provide advanced features like unified messaging and video telephony.

The TAS 112 may be a purpose-built hardware appliance or may be a virtualized network function (VNF) capable of running on general-purpose hardware or in a cloud environment as part of a network function virtualization (NFV) deployment.

The second cellular network 106 may have the characteristics described above in relation to the first cellular network 100, and may include a plurality of call control nodes, in the form of TASs, of which only one TAS 114 is shown for the sake of clarity, forming part of a core network of the cellular network 106.

Voice calls may be initiated or answered by use of a built-in telephone client on a user terminal 110A, 110B. The built-in telephone client is adapted to interwork with core network functions of the cellular networks 100, 106. Such a telephone client may be referred to as a "native" telephone client and a voice call made via a native telephone client may be referred to as a cellular-network-native voice call, being native to the cellular networks 100, 106. Such cellular-network-native voice calls are referred to herein as "native" voice calls for the sake of brevity. A native voice call is handled by call control nodes such as TASs 112, 114 in the core of the cellular network 100.

The cellular network 100 may employ the session initial protocol (SIP) for native voice calls. The TAS 112 may have SIP signalling capabilities and may be directly involved in a native voice call's signalling flow. The TAS 112 may be a SIP back-to-back user agent (B2BUA). It may act as a redirect server, proxy server, originating user agent and/or terminating user agent.

Non-cellular-network-native data exchange, which may be referred to as over-the-top (OTT) data exchange, may be conducted by a pre-installed or downloadable communications application installed on a user terminal 110A, 110B, referred to herein as a "meeting app". The meeting app is adapted to interwork with the meeting server 108. Note that, whilst the communications application is referred to herein as a "meeting app", it should be understood that the meeting app generally provides access to one or more communications services, which may or may not include one or more meeting service.

The meeting server 108 and the meeting apps on user terminals 110A, 110B make use of packet data links, for example Hypertext Transfer Protocol (HTTP) connections, which are set up through the cellular networks 100, 106 but do not pass through a cellular network's call control nodes. The packet data links may carry both session control data and session media data, which two elements are referred to herein generally as session data. The session data is used to establish and control the communications session, and to carry multimedia data to be exchanged between users during the communications session. The multimedia data may include video image data, still image data, textual data such as instant messaging data, data files, screen sharing data and/or hyperlink data.

A user terminal 110A, 110B may simultaneously conduct a native voice call via the native telephone client and OTT data exchanges via the meeting app.

Voice calls may be established via the meeting server 108. Such a voice call may be a two-party voice call, or may be a multi-party voice call (i.e. three-or-more-party voice call). A voice call established via the meeting server 108 may also referred to as a conference call, and may consist of two or more individual voice calls established between the respective users' user terminals 110A, 110B and the meeting server 108, bridged together at the meeting server 108. The individual voice calls may be PSTN voice calls, native voice calls and/or may be OTT data exchange voice calls. A user may access a conference call by dialling into a predetermined service number and entering a conference ID after the call is answered by an Interactive Voice Response (IVR) component at the meeting server 108. Alternatively, or in addition, a user may access a conference call by clicking on a hyperlink in a Hypertext Markup Language (HTML) formatted communication such as an email. Further alternatively, or in addition, a user may access a conference call by receiving an out-dial voice call from the meeting server 108 after having been invited by one of the other participants using a meeting app on their user terminal 110A, 110B.

A communications session established via the meeting server 108 may involve a voice call component and/or a multimedia data exchange component.

The meeting server 108 may be a purpose-built hardware appliance or may be a virtualized network function (VNF) capable of running on general-purpose hardware or in a cloud environment as part of a network function virtualization (NFV) deployment.

FIG. 1 illustrates a communications state, in which first and second users are conducting a native voice call, which has been established via each of the first and second TAS 112, 114 and via the PSTN 102, on their cellular user terminals 110A, 110B. The voice call has for example been initiated by use of a native telephone dialler on one of the user terminals 110A, 110B and has been answered by use of a native telephone answering function on the other user terminal 110A, 110B. The voice call includes a first call leg 116, established between the first user terminal 110A and the first TAS 112, a second, middle, call leg 118, established between the first TAS 112 and the second TAS 114, and a third call leg 120, established between the second TAS 114 and the second user terminal 110B. The middle call leg 118 may be established via the PSTN 102, as shown. In an alternative (not shown), where the two user terminals 110A, 110B are operating in the same cellular network, the middle call leg may be established across two different TASs within the cellular network. Where the two user terminals are currently being serviced by the same TAS, the middle call leg 118 may not exist at the physical level but may be controlled as a logical connection within a single TAS. The meeting server 108 may also be co-located with a, or the, TAS.

Figure 2:
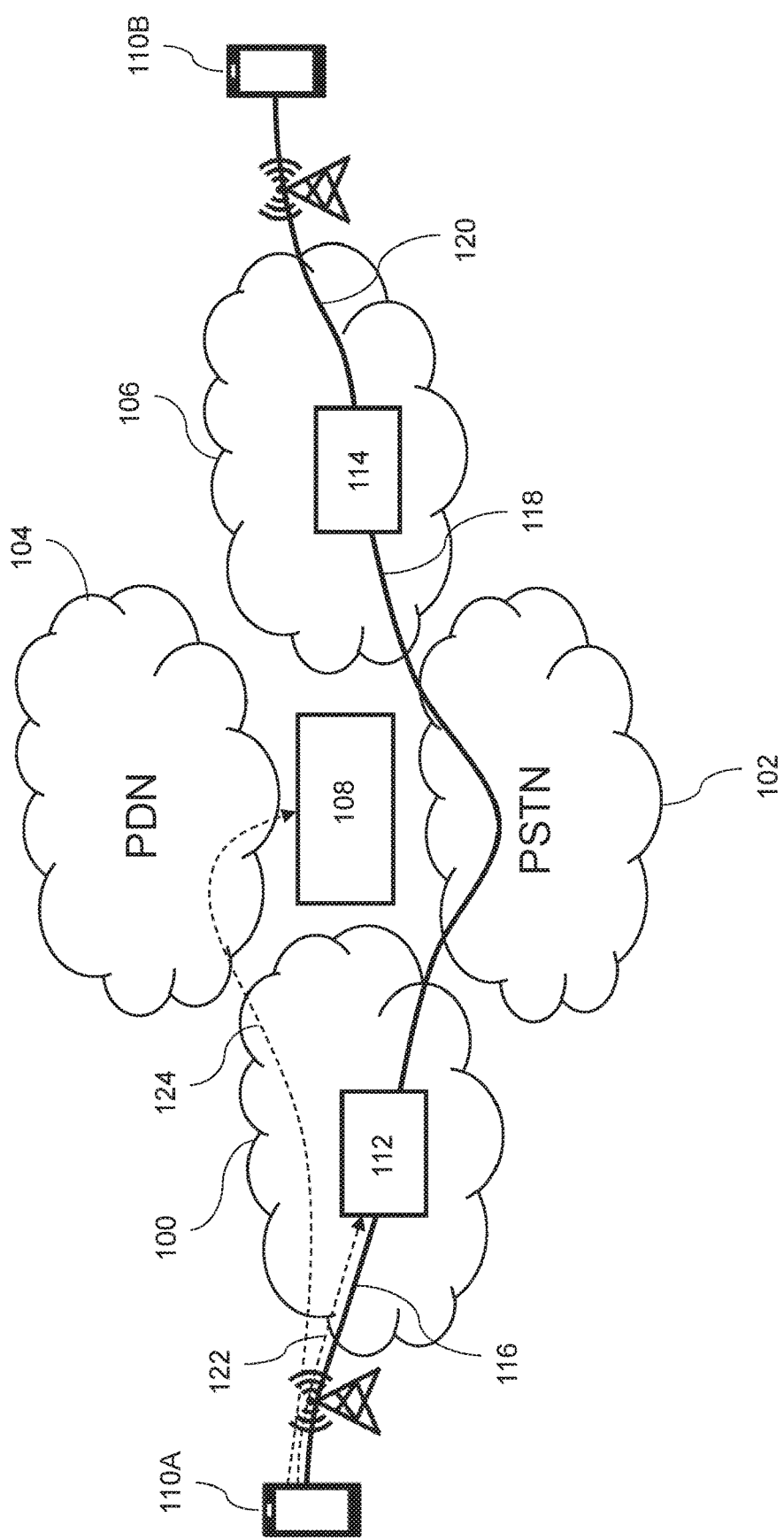
FIG. 2 shows a schematic depiction of the network of FIG. 1 when the voice call is to be uplifted by a first user whilst keeping the first user terminal on the voice call.

FIG. 2 illustrates a communications state, in which the first user has initiated an uplift in communication whilst keeping the first user terminal 110A on the native voice call. The first user may for example initiate an uplift in communication by opening the meeting app during the call, and pressing a single button, or a combination of buttons, on the user interface provided by the meeting app to request uplift of an in-progress native voice call. In response to the initiation, the meeting app may query the operating system of the first user terminal 110A for call-characterising data indicating one or more characteristics of the currently in-progress call. The call-characterising data may include, for example, a telephony party identifier of the second user, which is associated with the second user terminal, and which may be either the calling party ID or the called party ID for the call, depending on which party initiated the call.

The meeting app may cause the first user terminal 110A to transmit a call control instruction message 122 to the first TAS 112. The call control instruction message 122 is for associating a to-be-established new call leg, between the TAS 112 and the meeting server 108, with the currently in-progress native voice call. The call control instruction message 122, and/or subsequent call control data sent from the first user terminal 110A and the meeting server 108, includes one or more elements of call control data.

The call control instruction message 122, and/or subsequent call control data sent from the first user terminal 110A to the TAS 112, may include call control data requesting communications uplift processing to be initiated by the TAS 112. The TAS 112 processes the call control instruction message 122, and in response, sets a call feature, referred to herein as "call-based uplift", relating to receiving an incoming call from the meeting server 108. The call feature may be set on the TAS 112 in relation to the telephony party identifier of the first user.

The call control instruction message 122, and/or subsequent call control data sent from the first user terminal 110A to the TAS 112, may include call control data in the form of call-identifying data indicative of the first user's telephony party identifier, namely that associated with the first user terminal 110A, and/or the call-characterising data. The TAS 112 may use the call-identifying data to identify call state associated with the currently in-progress native voice call, and to set a call-based uplift feature only for the currently in-progress call. Alternatively, or in addition, a call-based uplift feature may be set according to different parameters, such as an identity of the meeting server 108. Call control data is stored on the TAS 112 to indicate that the feature has been set.

The call control instruction message 122, and/or subsequent call control data sent from the first user terminal 110A to the TAS 112, may include call control data in the form of incoming-uplift-call identifying data. The incoming-uplift-call identifying data may include one or more of a telephony party identifier of the meeting server 108 used as a calling party identifier, a special service number used as called party identifier, or predetermined indicator to be included in signalling, associated with an incoming call from the meeting server 108.

The meeting app may cause the first user terminal 110A to transmit a session request message 124 to the meeting server 108, requesting the establishment of a communications session. In addition, the session request message may cause the meeting server 108 to establish a new call leg with the TAS 112, in order to make the meeting server 108 a party to the voice call via the new call leg, and to associate the new call leg with the communications session, in order to associate the communications session with the in-progress native voice call.

The session request message 124, and/or subsequent session data sent from the first user terminal 110A to the meeting server 108, includes one or more elements of session control data.

The session request message 124, and/or subsequent session data sent from the first user terminal 110A to the meeting server 108, may include session control data in the form of an identifier associated with the first user terminal, for example a telephony party identifier of the first user.

The session request message 124, and/or subsequent session data sent from the first user terminal 110A to the meeting server 108, may include session control data indicating that the first user wishes to uplift an existing native voice call into the data communications session.

The session request message 124, and/or subsequent session data sent from the first user terminal 110A to the meeting server 108, may include session control data in the form an identity associated with the TAS 112 to enable the meeting server to send uplift control data directly to the TAS 112. Such information may not be available to the user terminal 110A, or may not be necessary in order to perform uplift, and may not be included.

The session request message 124, and/or subsequent session data sent from the first user terminal 110A to the meeting server 108, may include session control data in the form of identity associated with the user terminal of the other call party, for example the telephony party identifier of the second users. Such information may not be necessary in order to perform uplift, and may not be included.

In response to receiving the session request message 124, the meeting server 108 may initiate a new call leg by sending a call establishment request from the meeting server 108 to the first user. The call establishment request may include an uplift party identifier. In an example, the uplift party identifier may be the telephony party identifier of the first user, which may be included in the call establishment request as the called party identifier for the new call leg. Alternatively, another form of identifier, for example a random string or number, may be used as the uplift party identifier. An uplift party identifier may be agreed between the first user terminal 110A and the meeting server 108, which may in turn each pass that identifier on to the TAS 112 for correlation. The uplift party identifier may be originally generated in the first user terminal 110A and passed onto the meeting server 108, or vice versa.

In response to receiving the call establishment request from the meeting server 108, the TAS 112 may correlate the uplift party identifier with the call control data set for the call-based uplift feature, and connect the new call leg 128 to the voice call on the basis of the correlating. The TAS 112 connects the new call leg 128 to the in-progress native voice call on the basis of the call control instruction message received earlier, to make the meeting server 108 a party to the voice call. The TAS 112 may merge the new call leg 128 with the existing call legs 116, 118.

Figure 3:
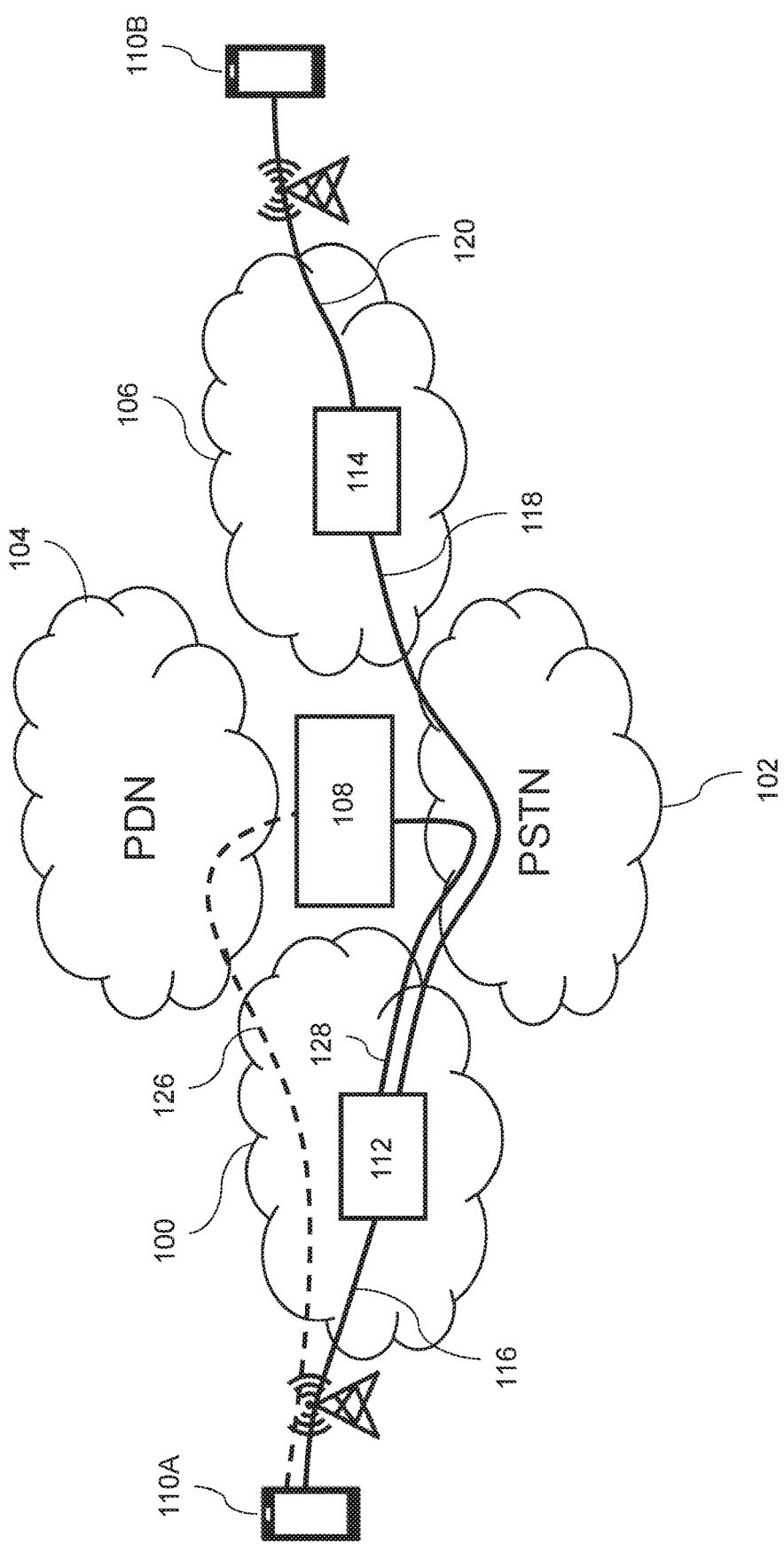
FIG. 3 shows a schematic depiction of the network of FIG. 1 when the voice call has been uplifted by the first user whilst keeping the first user terminal on the voice call.

FIG. 3 illustrates a communications state, in which the native voice call has been uplifted by the first user whilst keeping the first user terminal 110A on the native voice call.

The meeting server 108 may respond to the session request message 124 to establish a new communications session, for example a conference call, and to establish a communications link in the form of a data exchange connection 126, between first user terminal 110A and the second user terminal 110B, associated with the new communications session.

Figure 4:
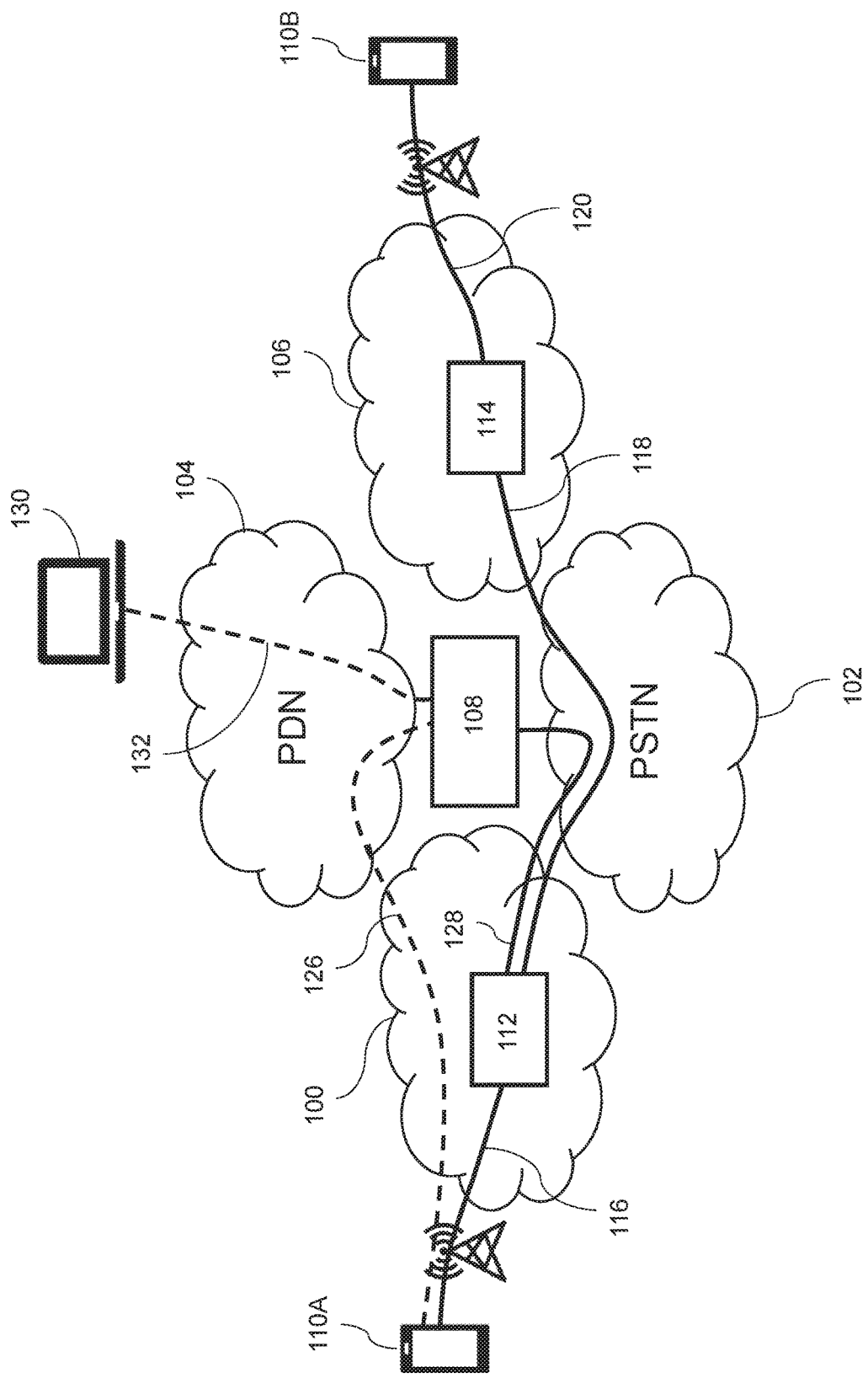
FIG. 4 shows a schematic depiction of the network of FIG. 1 when a three-way call has been set up whilst keeping the first user terminal on the voice call.

FIG. 4 illustrates a communications state, in which a three-way call has been set up whilst keeping the first user terminal 110A on the native voice call.

The first user terminal 110A, having uplifted communications as described in relation to FIGS. 1 and 3, may make use of various in-session services provided by the meeting server 108. For example, the call may be converted into a multi-party conference call. To convert the call into a multi-party conference call, the first user may interact with the meeting app on the first user terminal 100, in response to which the meeting app may transmit an add-participant request message to the meeting server 108 via the data exchange connection 126.

In response to receiving the add-participant request message, the meeting server 108 may cause an additional call with a further participant to be added, with the calls bridged together at the meeting server 108. The additional calls may be a PSTN voice call, a native voice call, an OTT data exchange voice calls. Alternatively, the additional call may be conducted from a computer terminal 130 via the PDN 104 via a further communications link 132. The additional user may access the conference call by dialling into a predetermined service number and entering a conference ID associated with the communications session set up by the first user, after the call is answered by an Interactive Voice Response (IVR) component at the meeting server 108. Alternatively, or in addition, the additional user may access the conference call by clicking on a hyperlink in a Hypertext Markup Language (HTML) formatted communication such as an email or text message sent by the first user from the first user terminal 110A, on the basis of session-identifying information received from the meeting server 108 over the session data link 126. Further alternatively, or in addition, the additional user may access the conference call by receiving an out-dial voice call from the meeting server 108 after having been invited by the first user using the meeting app on their user terminal 110A.

Figure 5:
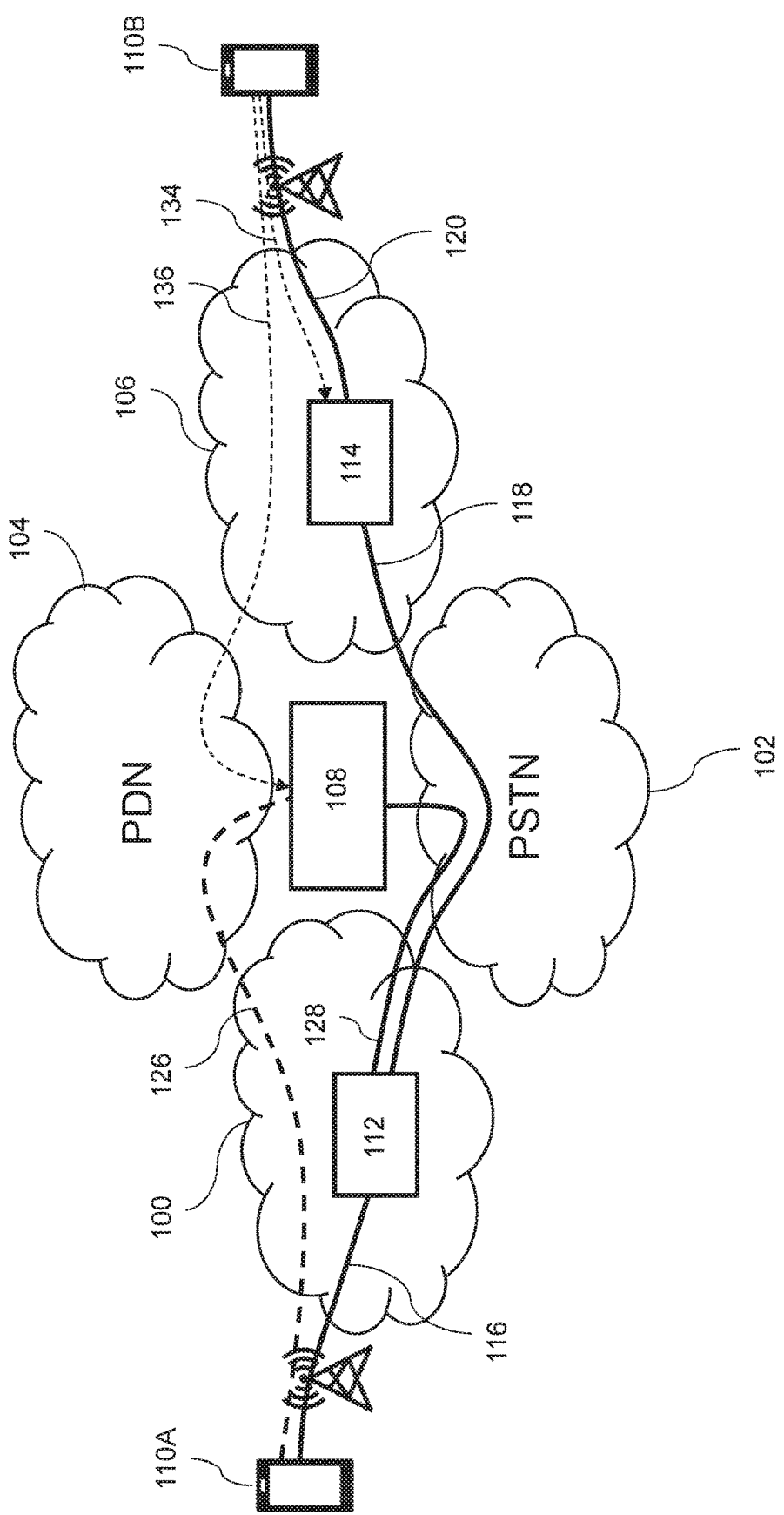
FIG. 5 shows a schematic depiction of the network of FIG. 1 when the voice call is to be uplifted by a second user whilst keeping the second user terminal on a voice call.

FIG. 5 illustrates a communications state, in which the native voice call is also to be uplifted by a second user whilst keeping the second user terminal 110B on the native voice call. In this state, the native voice call has already been uplifted by the first user as described in relation to FIGS. 1 to 3.

The second user terminal 110B transmits a call control instruction message 134, similar to the call control instruction message described above, to the second TAS 114. The second user terminal 110B also transmits a session request message 136, similar to the session request message 136 described above, to the meeting server 108.

The session request message 136 may cause the meeting server 108 to join the second user terminal 110B into the existing communications session, of which it is already a part for voice data exchange by virtue of the native voice call having been merged with the new call leg 128. After the meeting server 108 joins the second user terminal 110B into the existing communications session the second user may additionally conduct session control, and multimedia data exchange, via the meeting app on the second user terminal 110B.

Figure 6:
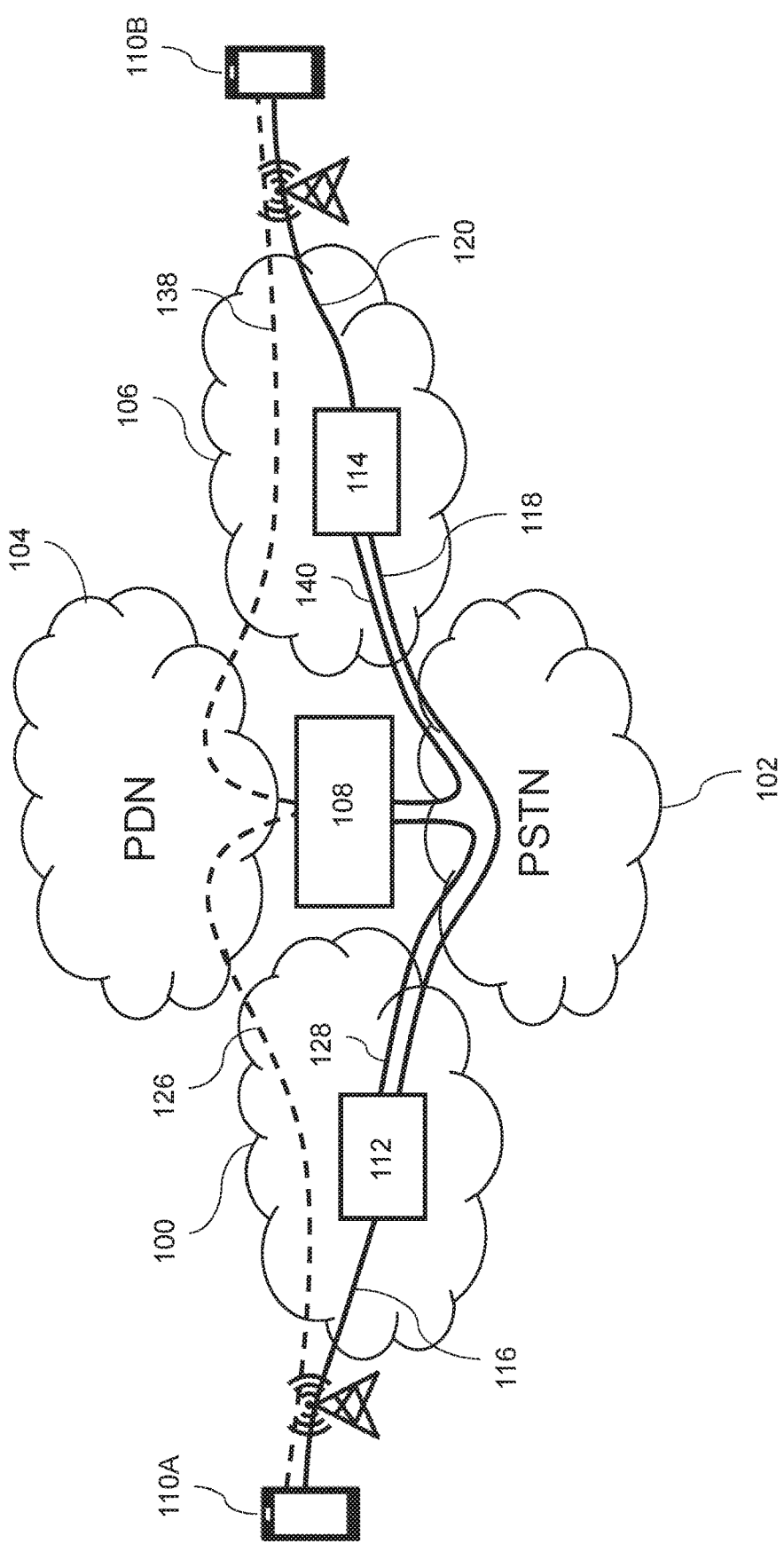
FIG. 6 shows a schematic depiction of the network of FIG. 1 when the voice call is being uplifted by the second user whilst keeping the first and second user terminals on the voice call.

FIG. 6 illustrates a communications state, when the native voice call is being uplifted by the second user whilst keeping the first and second user terminals 110A, 110B on the native voice call. The session request message 136 may cause the meeting server 108 to initiate a establish a further call leg 140, shown in FIG. 6, in a manner similar to the way in which the new call leg 128 has been established. The further call leg 140 may be merged with the other call legs 118, 120 at the second TAS 114, thus associating the further call leg 140 with the communications session.

Figure 7:
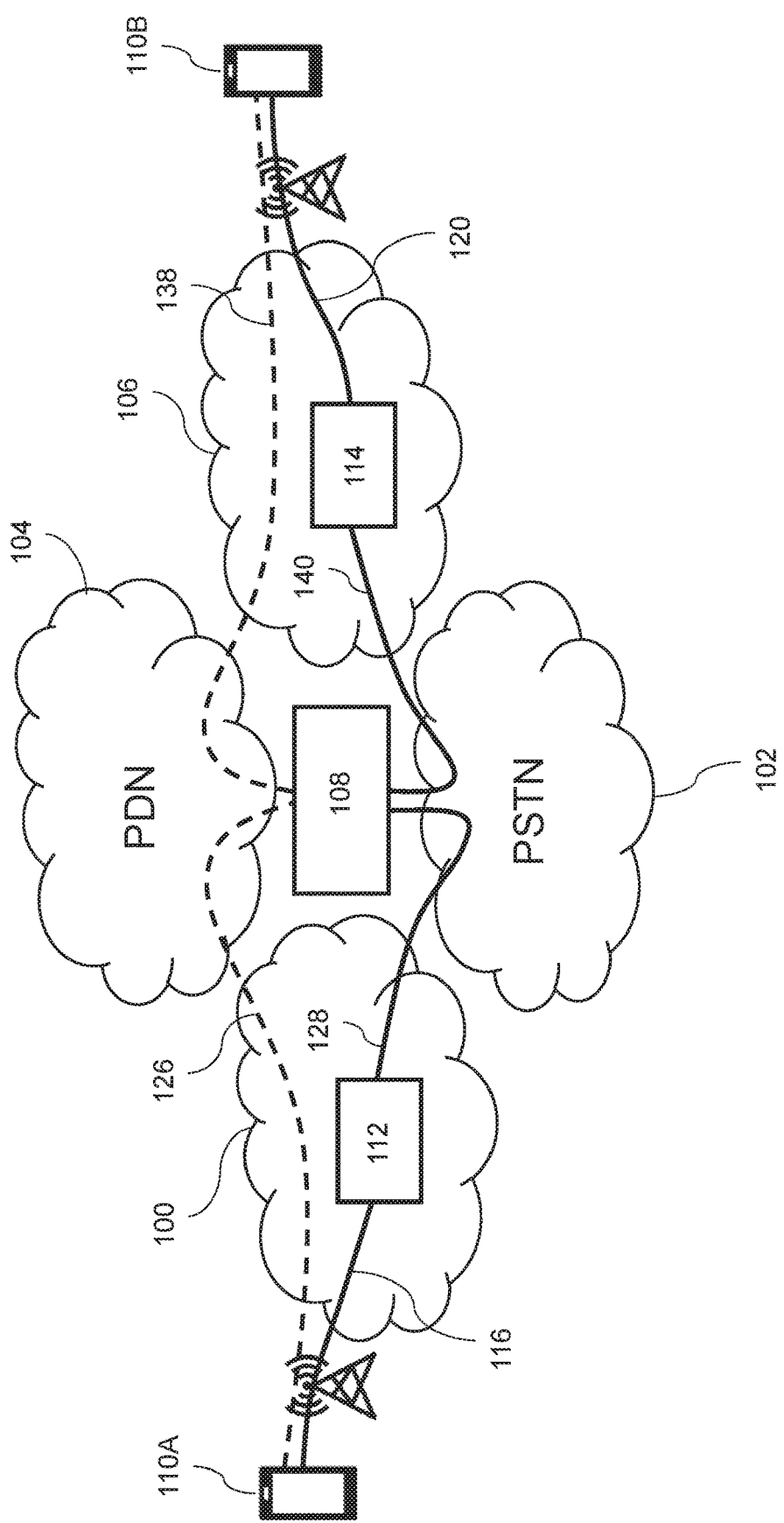
FIG. 7 shows a schematic depiction of the network of FIG. 1 when the voice call has been uplifted by the first and second users whilst keeping the first and second user terminals on respective ends of the voice call.

FIG. 7 illustrates a communications state, when the native voice call has been uplifted by the first and second users whilst keeping the first and second user terminals 110A, 110B on respective ends of the native voice call. The middle call leg 118 may be torn down by the second TAS 114 once the further call leg 140 has been merged with the other call legs 118, 120 at the second TAS 114. An instruction to tear down the middle call leg 118 after establishment of the further call leg may accompany either the call establishment request for establishing the further call leg 114, or the call control instruction message call control instruction message 134.

In the example described above in FIGS. 6 to 8, the first and second TAS conduct call uplift processing by merging in new call legs. In an alternative, a TAS may cut over to a new call leg rather than merging in the new call leg. In this example, rather than merging in the new call leg 128 with the original middle call leg 118 as shown in FIG. 5, the first TAS 112 may cut over from the middle call leg 118 to the new call leg 128. And, rather than merging in the new call leg 140 with the original middle call leg 118 as shown in FIG. 6, the second TAS 114 may cut over from the middle call leg 118 to the new call leg 140, with a resulting communications state as shown in FIG. 7. In this example, the two ends of the call may co-ordinate triggers which cause the cut-overs to the new call legs, so that there is no glitch in the voice call uplift procedure. The co-ordination may be done by conducted by any of the control nodes involved in the uplift procedure, namely the first and second user terminals 110A, 110B, the first and second TAS 112, 114 and the meeting server 108, either alone or in combination.

The TAS 112 may for example connect the new call leg 128 to the in-progress native voice call on the basis of the call control instruction message received earlier, to make the meeting server 108 a party to the voice call, in response to receiving a trigger message from the user terminal 110A which causes the cut-over to the new call leg 128. Similarly the TAS 114 may for example connect the new call leg 140 to the in-progress native voice call on the basis of the call control instruction message received earlier, to make the meeting server 108 a party to the voice call, in response to receiving a trigger message from the user terminal 110B which causes the cut-over to the new call leg 140. The two user terminals, in particular the messaging apps on the user terminals, may co-ordinate the sending of each respective trigger message to each respective TAS 112, 114, by automatic communications between the messaging apps which confirm that each side is ready to perform uplift. Uplift, and the cut-overs performed by the TAS 112, 114 can then be performed at exactly the same time, or at least effectively the same time to avoid glitches. Prior to the trigger messages being sent to the TAS 112, 114 by the respective user terminal 110A, 110B, the user terminals may be informed by each respective TAS that it is ready for uplift, having received a call establishment request from the meeting server 108.

Figure 8:
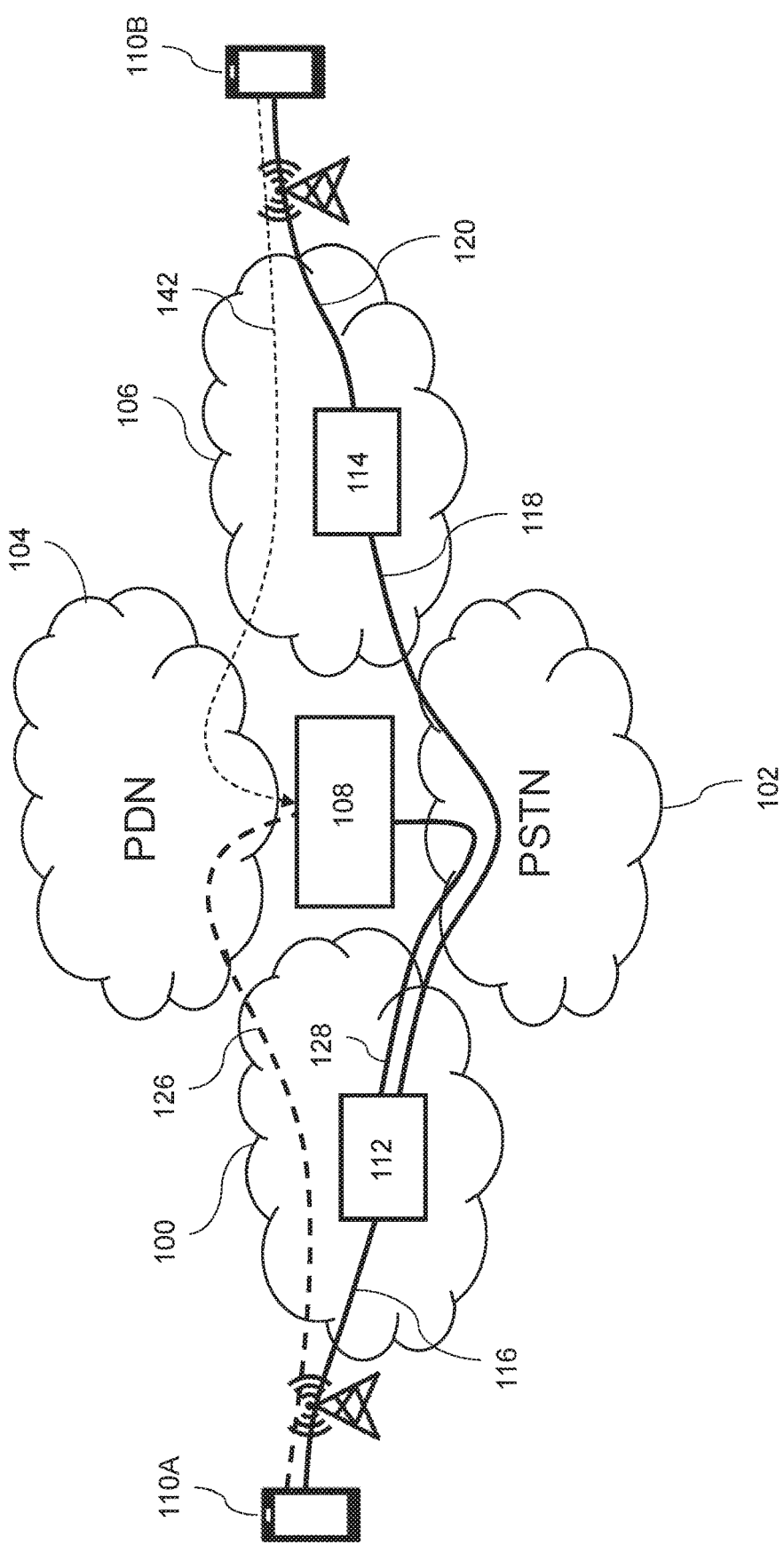
FIG. 8 shows a schematic depiction of the network of FIG. 1 when the voice call is to be uplifted in respect of a second user without keeping the second user terminal on the voice call.

In some examples, as TAS, in this case the second TAS 114, cannot conduct call-based uplift or other forms of call uplift processing. The TAS may, for example, be a legacy TAS. FIG. 8 illustrates a communications state, when the native voice call is to be uplifted in respect of a second user without keeping the second user terminal 110B on the native voice call.

Figure 9:
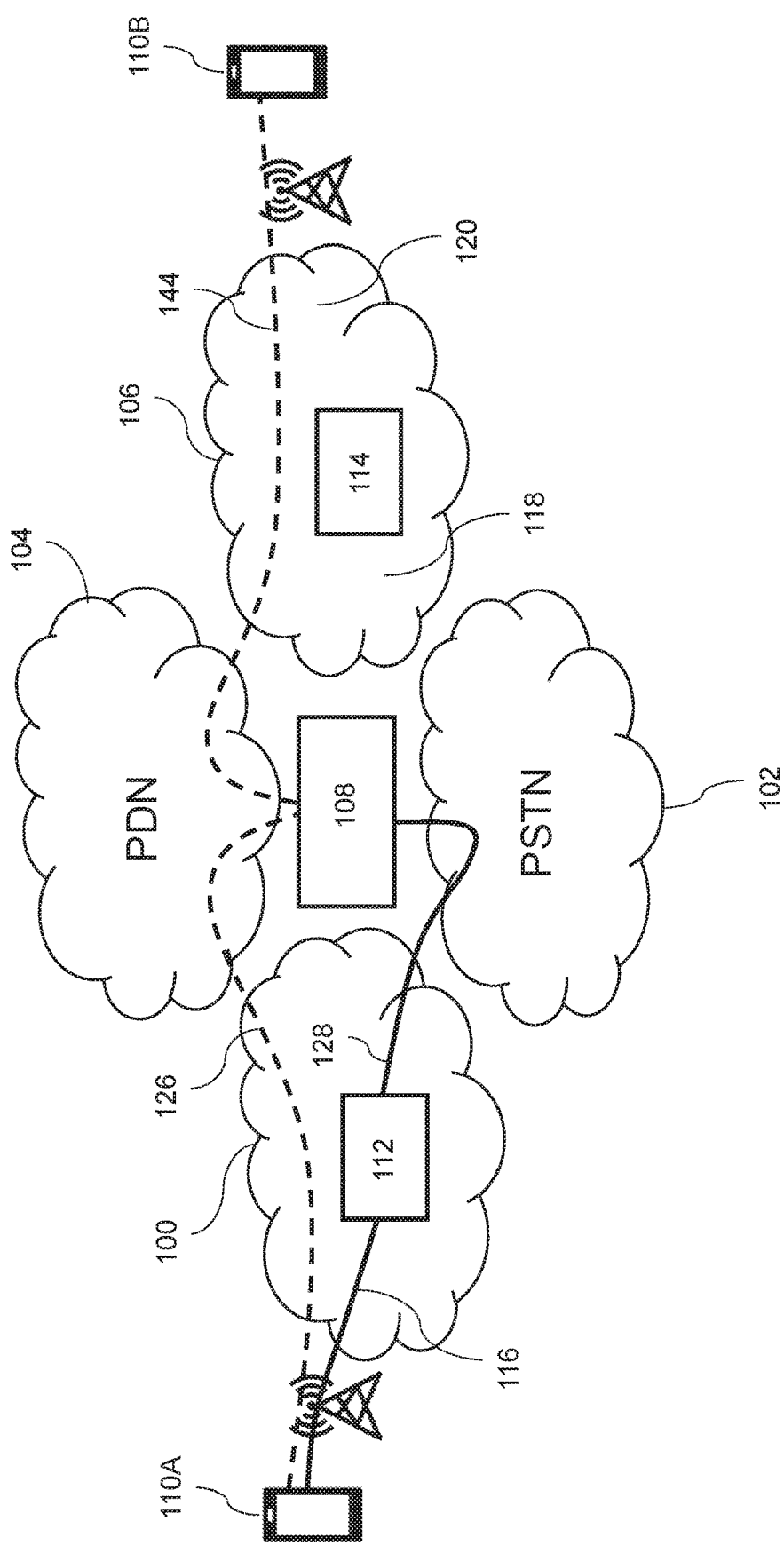
FIG. 9 shows a schematic depiction of the network of FIG. 1 when the voice call has been uplifted in respect of a second user without keeping the second user terminal on the voice call.

As before, the meeting app on the second user terminal 110B may send a session request message 142 whilst the call is in progress. However, in this case the meeting app on the second user terminal 110B does not send a call control instruction message to the second TAS 114. In response to the session request message 142, the meeting server may make the second user terminal a party to the communications session via a newly established data exchange link 144, as illustrated in FIG. 9, when the native voice call has been uplifted in respect of the second user without keeping the second user terminal 110B on the native voice call. In this case, the meeting app on the second user terminal 110B, or the second user themselves, may terminate the native voice call. The meeting app on the second user terminal 110B may connect the user to a new OTT voice call established via the meeting server 108. In this example, the meeting server 108 communicates voice call data for the conference call between the meeting server 108 and the first user terminal 110A via the new call leg 128 and communicates the voice call data between the meeting server 108 and the second user terminal via the newly established data exchange link 144.

As well as participating in the conference call managed by meeting server 108, the second user may now also conduct multimedia data exchange with the first user, using the meeting app on the second user terminal 110B, via the newly established data exchange link 144.

Whilst in the example shown in FIG. 8, the call legs 118, 128 are merged by the first TAS 112, the first TAS 112 may cut over from the old call leg 118 to the new call leg 108. The cut-over may be controlled by co-ordination between the messaging apps on the two user terminals, as described above.

In the example shown in FIGS. 8 and 9, the data exchange link 144 between the meeting server 108 and the second user terminal 110B is established by the meeting app sending from the second user terminal 110B a session request message 142. In the alternative, the meeting server 108 may initiate the establishment of the data exchange link 144 by transmitting a session request, for example as a push notification message, to the second user terminal in response to receiving the session control data from the first user terminal 110A.

In the above-described examples, a call control instruction is included in a call control instruction message 124 sent from the first user terminal 110A, or a similar message 134 sent from the second user terminal 110B, to a respective TAS 112, 114. Thus the call control state is changed under the control of the user's terminal. In an alternative, the message server 108 may be treated as a trusted party by a TAS 112, 114 and call control instructions may be included in signal-ling associated with a call establishment request sent by the meeting server 108 to set up the new call leg 128 and further call leg 140 respectively. The call control instructions may be based upon information included in session requests 124, 136 sent to the meeting server 108 by the first and second user terminals 110A, 110B respectively.

In the above-described examples, the new call leg 128 and further call leg 140 are established by a call establishment request originating at the meeting server 108. In alternative examples, a call establishment request may be originated at a respective TAS 112, 114 in order to set up the new call leg 128 and further call leg 140, in response to the call control instructions received from each respective user terminal 110A, 110B. Thus a TAS 112, 114 may transmit a call establishment request to the meeting server 108 in response to the call control instruction. The call establishment request may comprise a calling party identifier associated with the first user. The meeting server may transmit an answer message to the call establishment request to accept the call. The TAS 112, 114 may establish the new call leg 128, and further call leg 140, in response to the answer, and proceed to merge it with the in-process native voice call as described above.

Where a call establishment request is originated at a TAS 112 in order to set up the new call leg 128, the TAS may include a session establishment request in signalling associated with the call establishment request, the session establishment request identifying a characteristic of the communications session, for example the telephony party identifiers.

Whilst in the above examples, the call control node is a telephony application server in the core network, the call control node may take other forms. For example, the call control node may reside at least in part in a user terminal. A user terminal may for example include a SIP user agent capable of merging calls in the manner described.

Whilst some of the voice calls of the present disclosure provide native voice calls between the user terminals comprising circuit-switched network connections, and/or OTT voice calls comprising OTT Voice-over IP (VoIP) connections, it should be understood that the nature of the connection between the communications server and the respective user terminals is not critical to the present disclosure. Other network connections may be used, and the limitations of one or more of the user terminals may mean that a mix of fixed networks, mobile networks and different transport technologies or applications are used to provide the respective connections between the user terminals and between the user terminals and the communications server. Furthermore, whilst a user terminal terminates both a native voice call and acts as an endpoint the communications session, the two functions could be performed on separate devices at the user end. For example, a user may use a fixed line telephone with no data capabilities, to terminate the native voice call, and a desktop computer, to act as an endpoint the communications session, in order to perform call uplift as described.

In the above examples, the session data, such as the OTT voice call data, which are transmitted between the meeting server 108 and the meeting apps on user terminals 110A, 110B make use of packet data links, for example Hypertext Transfer Protocol (HTTP) connections, which are set up through the cellular networks 100, 106 but do not pass through a cellular network's call control nodes. In the alternative, or in addition, such session data may be transmitted via a separate network link, such as an Internet or other packet data network link accessed via a WiFi™ access point. The native voice call may also go via WiFi™, in the case that a user terminal 110A, 110B supports WiFi™ calling.

As mentioned above, a TAS may additionally provide advanced features like video telephony. In the above examples, the telephony call is a voice call. In the alternative, or additionally, the telephony call may be a video call, which may be handled natively in the cellular networks.

In the above examples, the original voice call is a two-party voice call. Alternatively, the original voice call may be a multi-party voice call.

Functionality of the present disclosure, in particular the meeting app on a user terminal, the meeting server 108, and the first and second TAS 112, 114, can be implemented on computer software by a conventional computing apparatus. Such computer software may be transmitted and installed via remote configuration, or may be accessed via download, for example via the Internet, or on some physical media, for example, DVD, CD-ROM, USB memory stick, etc. for which the computing apparatus has an appropriate media reader.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A method of operating a call control node in a telecommunications network, the method comprising the steps of:
    the call control node establishing a telephony call between a first user and a second user, the first user being associated with a first user terminal and the second user being associated with a second user terminal, the telephony call including (a) a first call leg established between the first user terminal and the call control node, (b) a second call leg established between the call control node and a remote call control node associated with the second user, and (c) a third call leg established between the remote call control node and the second user terminal;
    the call control node receiving a call control instruction, the call control instruction being for associating a to-be-established new call leg, between the call control node and a communications server, with the telephony call;
    the call control node establishing the new call leg between the call control node and the communications server; and
    the call control node connecting the new call leg established between the call control node and the communications server to the telephony call on the basis of the call control instruction, to make the communications server a party to the telephony call,
    wherein the method comprises:
        (i) the call control node tearing down the second call leg established between the call control node and the remote call control node in response to connecting the new call leg established between the call control node and the communications server to the telephony call, wherein a connection established between the communications server and the second user terminal enables voice call data to be communicated between the communications server and the second user terminal after said tearing down; or
        (ii) the call control node merging the second call leg established between the call control node and the remote call control node with the new call leg established between the call control node and the communications server in response to connecting the new call leg established between the call control node and the communications server to the telephony call.

2. The method of claim 1, comprising:
    receiving a call establishment request from the communications server, the call establishment request comprising an identifier associated with the first user; and
    establishing the new call leg between the call control node and the communications server in response to the call establishment request.

3. The method of claim 2, comprising:
    storing call control data in response to receiving the call control instruction;
    correlating the identifier with the call control data; and
    connecting the new call leg established between the call control node and the communications server to the telephony call on the basis of the correlating.

4. The method of claim 1, wherein the call control instruction is received from the first user terminal.

5. The method of claim 2, wherein the call control instruction is included in signalling associated with the call establishment request.

6. The method of claim 1, comprising:
    transmitting a call establishment request to the communications server in response to the call control instruction, the call establishment request comprising an identifier associated with the first user;
    receiving an answer to the call establishment request; and
    establishing the new call leg between the call control node and the communications server in response to the answer.

7. The method of claim 6, comprising including a session establishment request in signalling associated with the call establishment request, the session establishment request identifying a characteristic of the communications session.

8. A computing apparatus configured to implement a call control node, the computing apparatus comprising a processor and a memory, and instructions stored in the memory which, when executed by the processor, cause the apparatus to:
    establish a telephony call between a first user and a second user, the first user being associated with a first user terminal and the second user being associated with a second user terminal, the telephony call including (a) a first call leg established between the first user terminal and the call control node, (b) a second call leg established between the call control node and a remote call control node associated with the second user, and (c) a third call leg established between the remote call control node and the second user terminal;
    receive a call control instruction, the call control instruction being for associating a to-be-established new call leg, between the call control node and a communications server, with the telephony call;
    establish the new call leg between the call control node and the communications server; and
    connect the new call leg established between the call control node and the communications server to the telephony call on the basis of the call control instruction, to make the communications server a party to the telephony call, wherein the call control node is adapted to:

(i) tear down the second call leg established between the call control node and the remote call control node in response to connecting the new call leg established between the call control node and the communications server to the telephony call, wherein a connection established between the communications server and the second user terminal enables voice call data to be communicated between the communications server and the second user terminal after the tear down of the second call leg; or (ii) merge the second call leg established between the call control node and the remote call control node with the new call leg established between the call control node and the communications server in response to connecting the new call leg established between the call control node and the communications server to the telephony call.

* * * * *